US010255260B2

(12) United States Patent
Kollur et al.

(10) Patent No.: US 10,255,260 B2
(45) Date of Patent: Apr. 9, 2019

(54) SYSTEM AND FRAMEWORK FOR TRANSFORMING DOMAIN DATA

(71) Applicant: Bank of America Corporation, Charlotte, NC (US)

(72) Inventors: Basawaraj Swamy Kollur, West Chester, PA (US); Lakshminarayana Jonnakoti, Hockessin, DE (US); Aravinth Murugesan Mallika, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 189 days.

(21) Appl. No.: 14/988,880

(22) Filed: Jan. 6, 2016

(65) Prior Publication Data

US 2017/0192951 A1  Jul. 6, 2017

(51) Int. Cl.
*G06F 17/00* (2006.01)
*G06F 17/24* (2006.01)
*G06F 3/048* (2013.01)
*G06F 17/21* (2006.01)

(52) U.S. Cl.
CPC ............ *G06F 17/245* (2013.01); *G06F 3/048* (2013.01); *G06F 17/21* (2013.01); *G06F 17/24* (2013.01)

(58) Field of Classification Search
CPC ........ G06F 17/24; G06F 17/21; G06F 17/245; G06F 3/048
See application file for complete search history.

(56) References Cited

U.S. PATENT DOCUMENTS

| | | |
|---|---|---|
| 5,345,586 A | 9/1994 | Hamala et al. |
| 7,606,813 B1 | 10/2009 | Gritsay et al. |
| 7,664,729 B2 | 2/2010 | Klein et al. |
| 8,311,975 B1 | 11/2012 | Gonsalves |
| 8,793,268 B1 * | 7/2014 | Gonsalves ........ G06F 17/30592 707/606 |
| 2005/0055351 A1 * | 3/2005 | Barton .............. G06F 17/30345 |
| 2005/0138160 A1 * | 6/2005 | Klein .................... H04L 41/024 709/223 |
| 2006/0179432 A1 * | 8/2006 | Walinga .............. H04L 41/0806 717/171 |

(Continued)

OTHER PUBLICATIONS

Poolet, Michelle A., "Designing for Performance: Lookup Tables", Jan. 24, 2006, downloaded from <http://sqlmag.com/database-administration/designing-performance-lookup-tables>.

*Primary Examiner* — Stephen S Hong
*Assistant Examiner* — Marshon L Robinson
(74) *Attorney, Agent, or Firm* — Banner & Witcoff, Ltd.; Michael A. Springs

(57) ABSTRACT

Methods, systems, and computer-readable media for transforming or modifying domain data are provided. A master control table may be generating including data from a plurality of domain data tables and a configuration associated with each domain data table. A user may modify a domain data table (or associated domain data) via the master control table. A user interface may be generated having a first portion, listing domain data tables in the master control table, and a second portion. Upon selection of a domain data table from the first portion, the second portion may be populated with the data and associated configuration of the selected domain data table. Modifications to the domain data table (and/or domain data) may be made via the second portion.

20 Claims, 12 Drawing Sheets

(56) References Cited

U.S. PATENT DOCUMENTS

| | | | |
|---|---|---|---|
| 2013/0086464 A1* | 4/2013 | Thangappan | G06F 17/30994 715/227 |
| 2014/0096085 A1* | 4/2014 | Adam | G06T 11/206 715/846 |
| 2014/0282153 A1* | 9/2014 | Christiansen | G06Q 30/0201 715/765 |
| 2016/0140254 A1* | 5/2016 | Yan | G06F 3/0484 715/771 |
| 2016/0170576 A1* | 6/2016 | Brown | G06F 3/0482 715/784 |

* cited by examiner

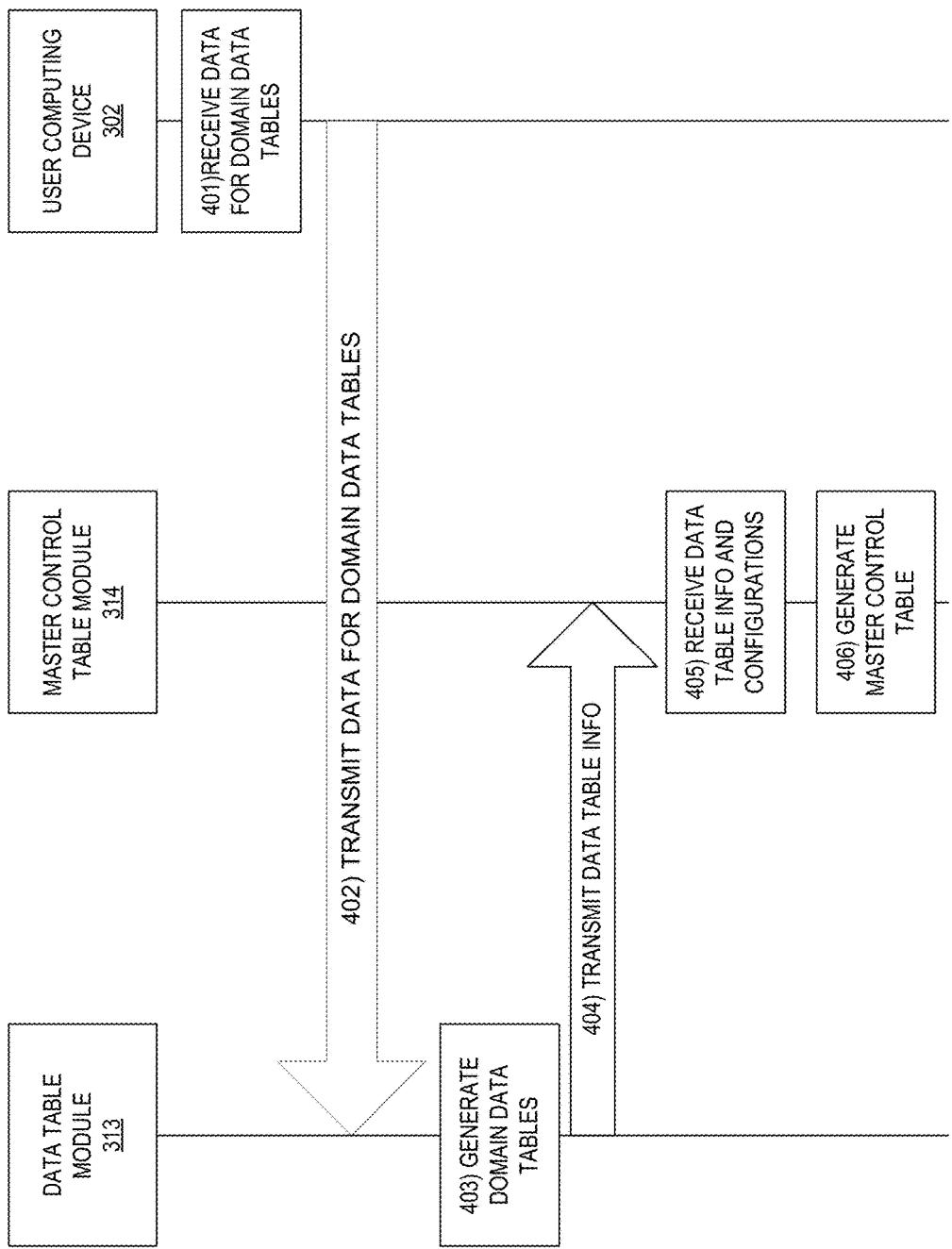

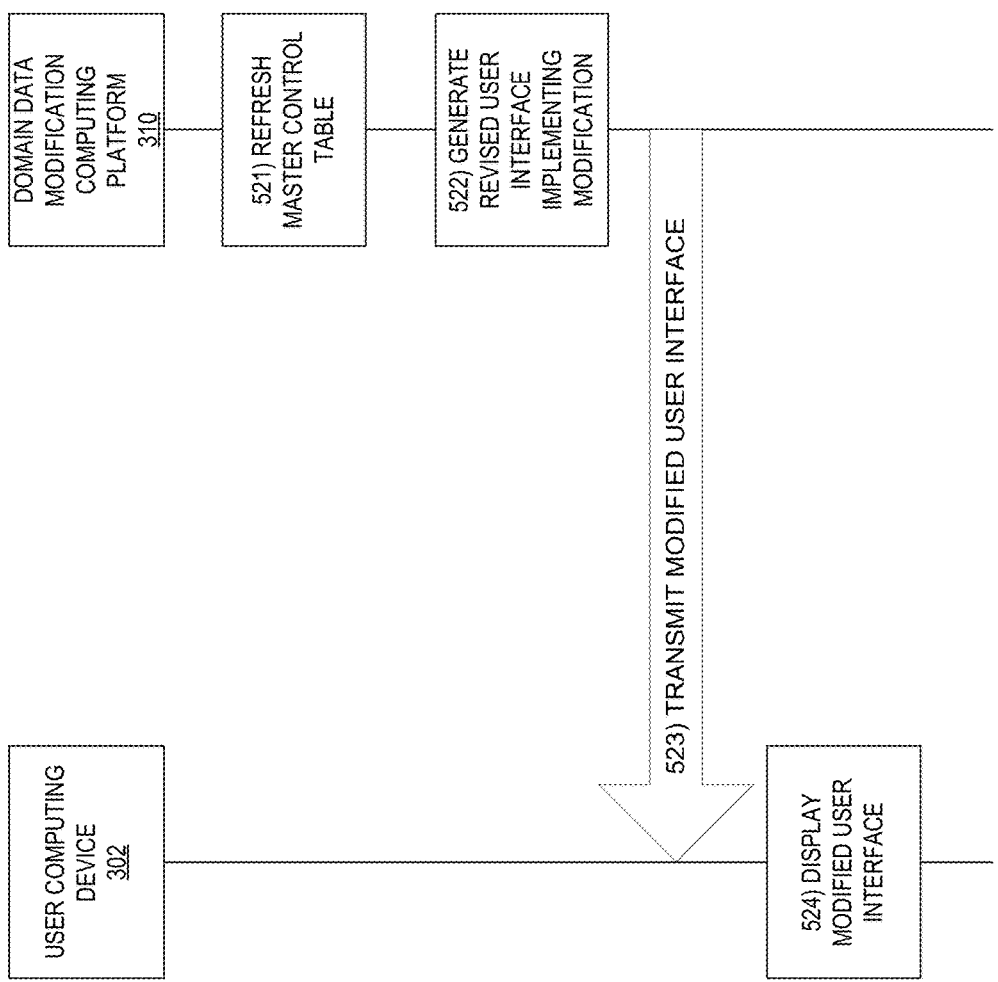

SYSTEM AND FRAMEWORK FOR TRANSFORMING DOMAIN DATA

BACKGROUND

Aspects of the disclosure relate to computer hardware and software. In particular, one or more aspects of the disclosure generally relate to computer hardware and software for dynamically transforming domain data.

Organizations, such as corporate entities and other large enterprise organizations, often store and implement data tables to facilitate use of one or more user interfaces (e.g., by a user via an on-line website, mobile application, or the like). The number of data tables may be extremely large and the number of users accessing the data stored therein may be tremendous. Accordingly, as changes (e.g., to a user interface) are desired or requested, an existing data table may require modification or a new data table may need to be created. This can be inefficient for the system, cause excessive use of system resources, and/or result in inaccuracies. Accordingly, a system and framework for dynamically modifying one or more data tables.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems that provide effective, efficient, and accurate ways of modifying domain data. In some examples, domain data tables may be aggregated or consolidated. A master control table may be generated including data from the domain data tables, as well as any configurations, definitions, types of data, and the like, associated with each table.

In some examples, a user interface may be generated. The user interface may include at least a first portion and a second portion. The first portion may be populated with a listing of available domain data tables. The first portion may be populated from the master control table. Upon selection of a domain data table, the second portion of the user interface may be populated. Populating the second portion may include displaying the data associated with the selected table, as well as the associated configuration, and the like. A user may them transform or modify the domain data via the master control table (e.g., via the second portion of the user interface). Any transformations or modifications may be implemented by refreshing the master control table.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative event sequence for generating a master control table in accordance with one or more aspects described herein;

FIGS. 5A-5E depict an illustrative event sequence for modifying a domain data table and/or associated data via the master control table according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities that support one or more applications (e.g., online applications, mobile applications, and the like) may rely on a plurality of domain data tables. Often the domain data tables are numerous and can be cumbersome and inefficient to modify. This may make implementing changes to one or more user interfaces associated with the application inefficient and prone to inaccuracies. Accordingly, the arrangements described herein include generating a master control table including data from a plurality of domain data tables. A configuration associated with each domain data table may also be stored by the master control table.

Upon receiving a request to modify a user interface or a domain data table (or associated data) the system may generate a user interface having a first portion and a second portion. The first portion may include a listing of domain data tables from the master control table. Upon selection of a domain data table from the first portion, the second portion may be populated with the data and associated configuration of the selected domain data table. Accordingly, a user may modify the selected domain data table in the second portion and those modifications may be implemented upon refreshing the master control table. These arrangements provide an efficient way of modifying domain data tables and aids in standardizing changes made.

These and various other aspects and features will be described more fully herein.

Figure 1:
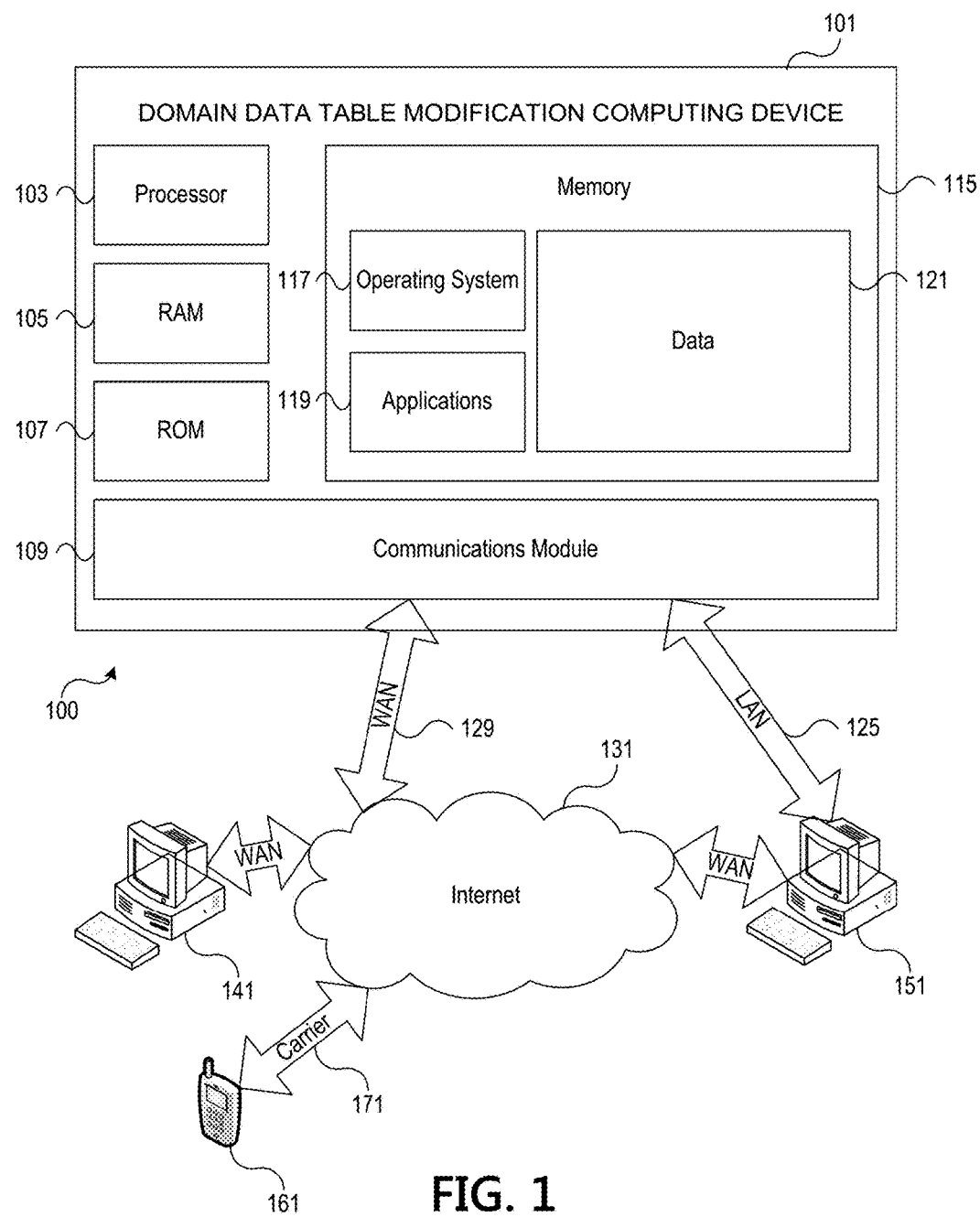
FIG. 1 depicts an illustrative operating environment in which various aspects of the disclosure may be implemented in accordance with one or more aspects described herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include domain data modification computing device 101 having processor 103 for controlling overall operation of domain data modification computing device 101 and its associated components, including random-access memory (RAM) 105, read-only memory (ROM) 107, communications module 109, and memory 115. Domain data modification computing device 101 may include a variety of computer readable media. Computer readable media may be any available media that may be accessed by domain data modification computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by domain data modification computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on domain data modification computing device 101. Such a processor may execute computer-executable instructions stored on a computer-readable medium.

Software may be stored within memory 115 and/or storage to provide instructions to processor 103 for enabling domain data modification computing device 101 to perform various functions. For example, memory 115 may store software used by domain data modification computing device 101, such as operating system 117, application programs 119, and associated database 121. Also, some or all of the computer executable instructions for domain data modification computing device 101 may be embodied in hardware or firmware. Although not shown, RAM 105 may include one or more applications representing the application data stored in RAM 105 while domain data modification computing device 101 is on and corresponding software applications (e.g., software tasks) are running on domain data modification computing device 101.

Communications module 109 may include a microphone, keypad, touch screen, and/or stylus through which a user of domain data modification computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Domain data modification computing device 101 may operate in a networked environment supporting connections to one or more remote computing devices, such as computing devices 141, 151, and 161. Computing devices 141, 151, and 161 may be personal computing devices or servers that include any or all of the elements described above relative to domain data table modification computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, domain data modification computing device 101 may be connected to LAN 125 through a network interface or adapter in communications module 109. When used in a WAN networking environment, domain data modification computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
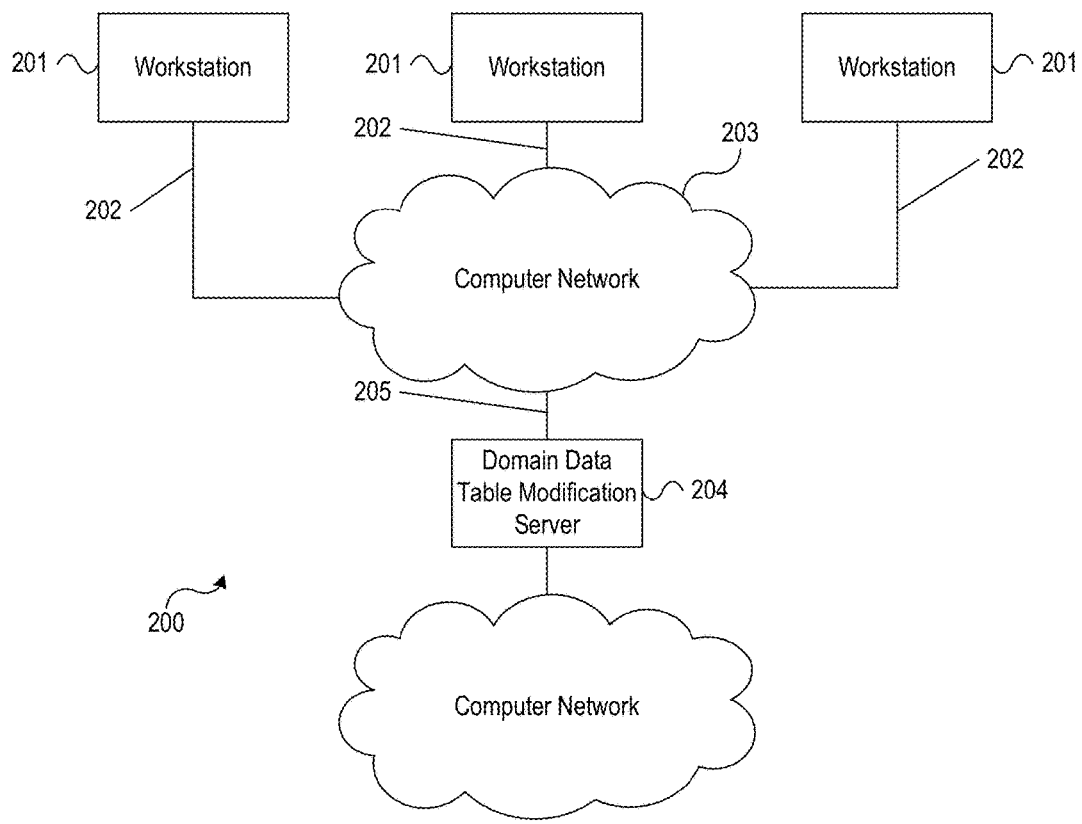
FIG. 2 depicts an illustrative block diagram of workstations and servers that may be used to implement the processes and functions of certain aspects of the present disclosure in accordance with one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to domain data table modification server 204. In system 200, domain data table modification server 204 may be any suitable server, processor, computer, or data processing device, or combination of the same. Domain data table modification server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and domain data table modification server 204, such as network links, dial-up links, wireless links, hard-wired links, as well as network types developed in the future, and the like.

Figure 3:
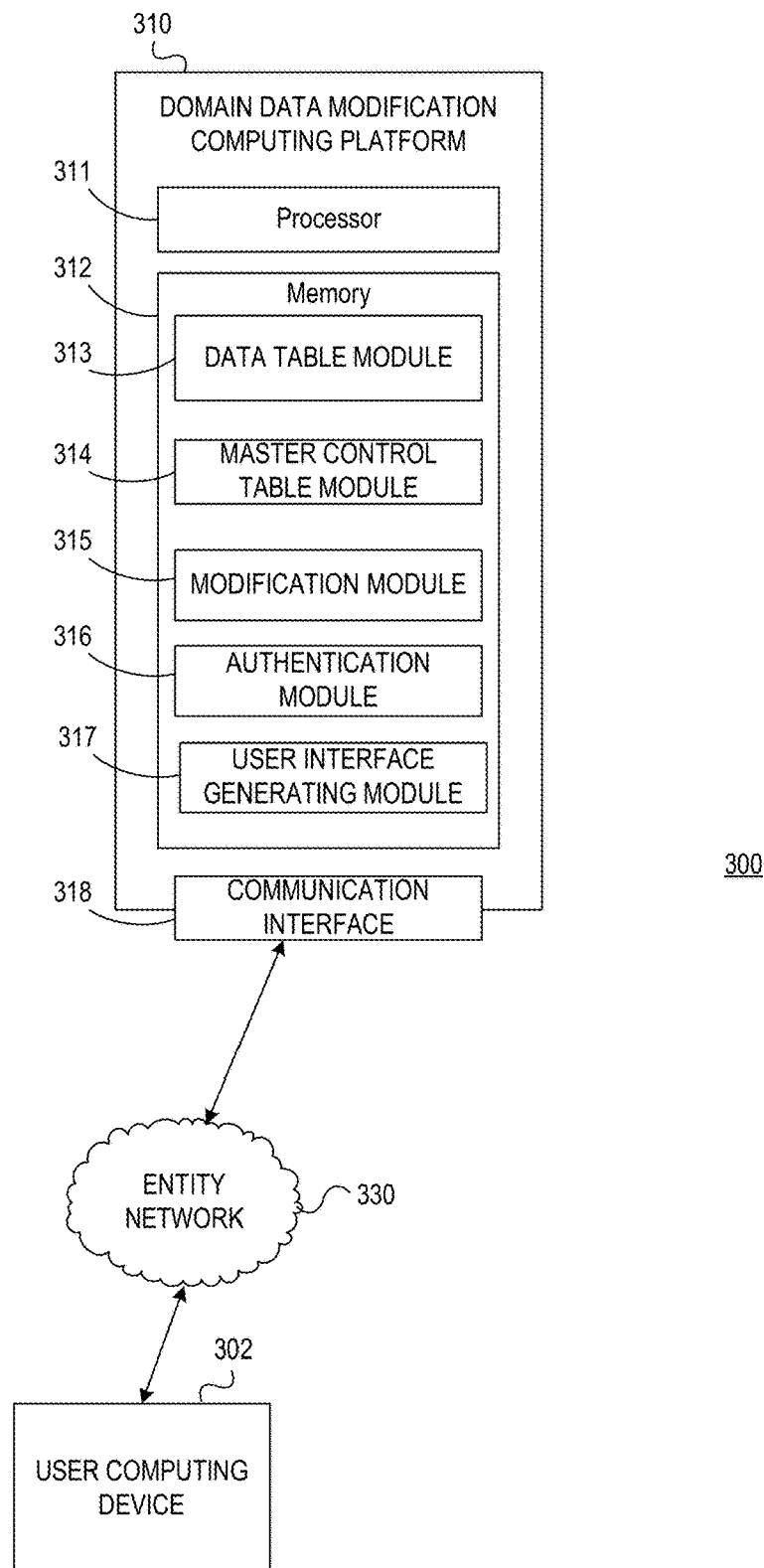
FIG. 3 depicts an illustrative computing platform for transforming domain data in accordance with one or more aspects described herein.

FIG. 3 depicts an environment 300 including an illustrative computing platform for modifying domain data via a master control table according to one or more aspects described herein. For instance, the environment 300 includes a domain data modification computing platform 310, which may include one or more processors 311, memory 312, and communication interface 318. A data bus may interconnect processor(s) 311, memory 312, and communication interface 318. Communication interface 318 may be a network interface configured to support communication between domain data modification computing platform 310, and one or more networks (e.g., network 330). Memory 312 may include one or more program modules having instructions that when executed by processor(s) 311 cause domain data modification computing platform 310 to perform one or more functions described herein and/or one or more databases that may store and/or otherwise maintain information which may be used by such program modules and/or processor(s) 311. In some instances, the one or more program modules and/or databases may be stored by and/or maintained in different memory units of the domain data modification computing platform 310 and/or by different computer systems that may form and/or otherwise make up the domain data modification computing platform 310.

For example, memory 312 may include a domain data table module 313. The data table module 313 may include hardware and/or software configured to perform various functions within the domain data modification computing platform. For instance, the data table module 313 may generate and/or store (e.g., in a database within the module) one or more domain data tables and/or configurations associated therewith. For instance, domain data tables that are currently available may be stored in the data table module 313. Further, a number of columns, types of data within each table, and the like, may be stored in the data table module 313.

In existing systems, modifying one or more domain data tables may require modifying the code associated with a particular data table. However, it is desirable to be able to dynamically modify the user interfaces which draw data from the one or more domain data tables. For instance, a website may have a plurality of user interfaces with various different options (e.g., from a drop down or other menu), may rely on various sources for verification of data, and the like. In order to change these user interfaces (and/or sources, and the like), the domain data table may be modified. However, the ability to dynamically modify one or more domain data tables (or data associated therewith) via a master control table, as discussed herein, creates a more efficient computing system since it reduces or eliminates the need for hard coded changes to a desired data table.

Memory 312 may further include a master control table module 314. The master control table module 314 may include hardware and/or software configured to perform various functions within the domain data modification computing platform 310. For instance, the master control table module 314 may receive data from the data table module 313 and may generate a master control table. The master control table may include some or all of the data from the plurality of domain data tables stored in the data table module 313, as well as configuration information (e.g., type of data, number of columns, and the like) associated with each domain data table stored in the data table module 313. Accordingly, as will be discussed more fully herein, the master control table may enable a user to dynamically modify a domain data table (or data associated therewith) via a user interface providing data from the master control table.

The memory 312 may also include a modification module 315. The modification module 315 may include hardware and/or software configured to perform various functions within the domain data modification computing platform 310. For instance, the modification module 315 may receive requested modifications to a user interface, an associated domain data table, or the like. The requested modification may be received from, for example, a user computing device 302. The user computing device 302 may be one of various types of devices, such as a mobile device, laptop computing device, desktop computing device, tablet computing device, and the like.

Various types of modifications may be requested. For instance, as discussed above, the domain data tables may be used to generate one or more user interfaces (e.g., for an on-line or mobile application, or the like). The one or more user interfaces may include various settings, options, and the like. Modifications to any of these settings, time outs, sources used to verify data based on input received via the user interface, menu options, and the like, may be requested via the modification module 315. The modification module 315 may then be used, in conjunction with various other components of the domain data modification computing platform 310, to facilitate the requested modification, as will be discussed more fully herein.

Domain data modification computing platform 310 may further include an authentication module 316. The authentication module 316 may include hardware and/or software configured to perform various functions within the domain data modification computing platform 310. For instance, modifications to domain data may be restricted to authorized users. Accordingly, upon a modification being requested, the authentication module 316 may confirm that the requesting user is authorized to make one or more changes or modifications. In some examples, the authentication module 316 may store a list of authorized users including a name, employee number or other unique identifier, a username, a password or personal identification number, biometric data, and the like. This information may be compared with login or authentication information provided during the modification request process in order to determine whether the user is authorized to make a modification (and therefore enable or permit modification) or is not authorized, and thereby prevent modifications.

The domain data modification computing platform 310 may further include a user interface generating module 317. The user interface generating module 317 may include hardware and/or software configured to perform various functions within the domain data modification computing platform 310. For instance, the user interface generating module 317 may generate a user interface that may be used to facilitate requested modifications. For instance, the user interface module 317 may generate a modification user interface having two portions. The first portion may include a listing of available domain data tables that may be modified. The second portion may include, upon selection of a domain data table from the first portion, a display of the domain data table with associated configurations, and the like. The user interface may be generated from the master control table which includes all of the domain data tables and associated configurations. Accordingly, the system may generate the user interface, and display associated data, using information provided from the master control table (e.g., without retrieving information from, accessing, or the like, each individual domain data table).

In some examples, the user interface generating module 317 may also generate one or more user interfaces for use in the application which relies on the domain data tables. That is, a user interface for which a modification is requested may be generated by the user interface generating module 317 upon implementation of the modification. The generated user interface may then include the modification made to the domain data via the master control table, as will be discussed more fully herein.

FIG. 4 depicts an illustrative event sequence for generating a master control table that may be used to facilitate modifications to domain data and/or one or more associated user interfaces according to one or more aspects described herein. It should be noted that the events shown and described with respect to FIG. 4 are merely one example sequence and some steps may be omitted, or additional steps added, without departing from the invention.

In step 401, data associated with one or more domain data tables may be received, such as via a user computing device 302. In some examples, receiving the data may include uploading or coding information that may be used to create a domain data table. In step 402, the received data may be transmitted to the domain data table module 313 and, in step 403, one or more domain data tables may be generated.

In some examples, domain data tables might already have been generated or may already exist. In these arrangements, steps 401-403 may be omitted.

In step 404, domain data table information may be transmitted to the master control table module 314. The domain data table information may include the data associated with each domain data table, as well as configuration information associated with each domain data table. In step 405, the transmitted domain data table information may be received by the master control table module 314.

In step 406, the master control table may be generated. Generating the master control table may include aggregating or compiling the received domain data table information including data and configuration information. This aggregated or compiled information may be stored in the master control table in order to facilitate dynamic modification of the data (and associated user interfaces). That is, modifications to any of the domain data tables associated with the master control table may be performed via the master control table without accessing or directly modifying the domain data table being modified. Rather, the modification may be made via the master control table and the modified data may be stored therein.

FIGS. 5A-5E depict an illustrative event sequence for modifying domain data via the master control table according to one or more aspects described herein. It should be noted that the events shown and described with respect to FIGS. 5A-5E are merely one example sequence and some steps may be omitted, or additional steps added, without departing from the invention.

Figure 5A:
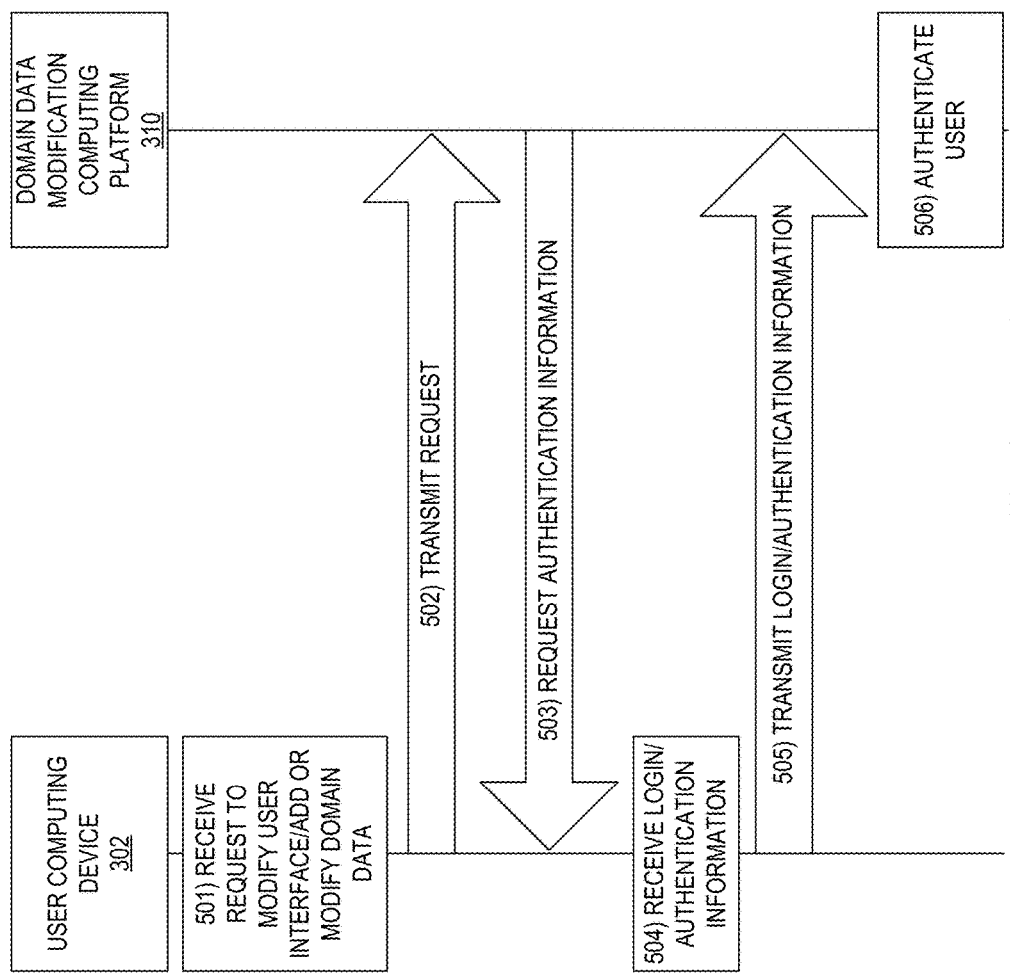

With reference to FIG. 5A, in step 501, a request to modify a user interface, a domain data table (and/or associated domain data), and/or add a new domain data table may be received. The request may be received from a user computing device, such as user computing device 302 in FIG. 3. As discussed herein, the requested modification may include a request to modify one or more of a setting, a menu option, a source used to verify data, and the like. In some examples, the requested modification may be associated with more than one user interface (e.g., a series of user interfaces associated with an application being implemented on a computing device), multiple domain data tables, and the like.

In step 502, the requested modification may be transmitted to the domain data modification computing platform 310. In response to the request, the domain data modification computing platform 310 may transmit a request for authentication information to the user computing device 302 in step 503. In some examples, the request for authentication information may be transmitted from the authentication module 316 within the domain data modification computing platform 310.

In step 504, login and/or authentication information may be received by the user computing device 302 and transmitted to the authentication module 316 of the domain data modification computing platform 310 in step 505. The login/authentication information may include a username and password combination, personal identification number, biometric data of the user, and the like.

In step 506, the user may be authenticated by, for instance, the authentication module 316 of the domain data modification computing platform 310. For instance, the received login/authentication information may be compared to pre-stored login/authentication information for authorized users to determine whether the user requesting the modification is an authorized user. If so, the process may continue to FIG. 5B. If not, the process may end and, in some examples, the requesting user may be notified that the provided login/authentication information did not match pre-stored information for authorized users.

Figure 5B:
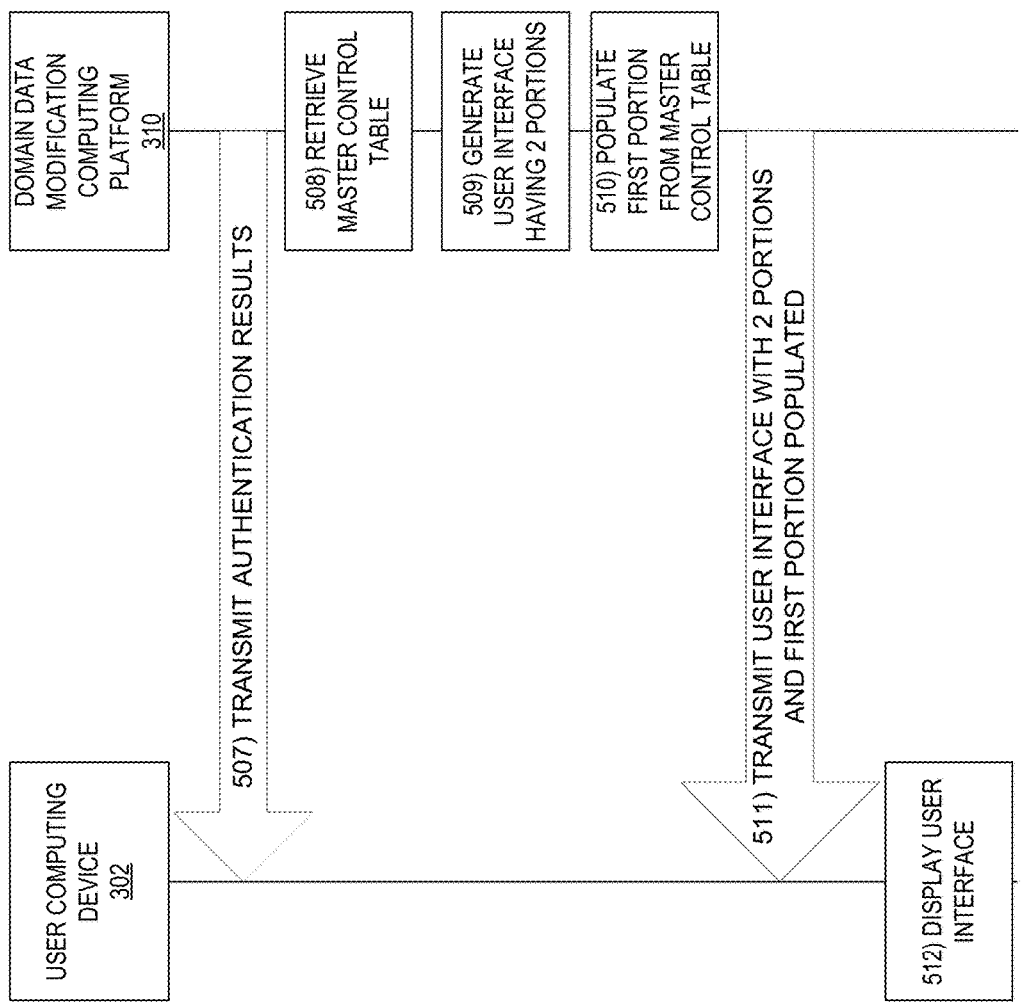

For instance, with reference to FIG. 5B, at step 507, the authentication results may be transmitted from the domain data modification computing platform 310 to the user computing device 302. The results may be displayed on the user computing device and may indicate whether the login/authentication information was authenticated.

In step 508, the master control table may be retrieved (e.g., from the master control table module 314). In step 509, a modification user interface may be generated having two portions. For instance, the user interface generating module 317, may generate a modification user interface that includes a first portion and a second portion. In step 510, the first portion of the generated modification user interface may be populated with a listing of available domain data tables retrieved from the master control table. That is, the generated modification user interface may be generated using data from the master control table in order to efficiently and dynamically modify data, user interfaces, and the like.

In step 511, the generated modification user interface with the first portion populated may be transmitted to the user computing device 302. As indicated herein, the first portion may include a listing of all domain data tables available for modification. The generated modification user interface with the first portion populated may be displayed on the user computing device in step 512.

Figure 5C:
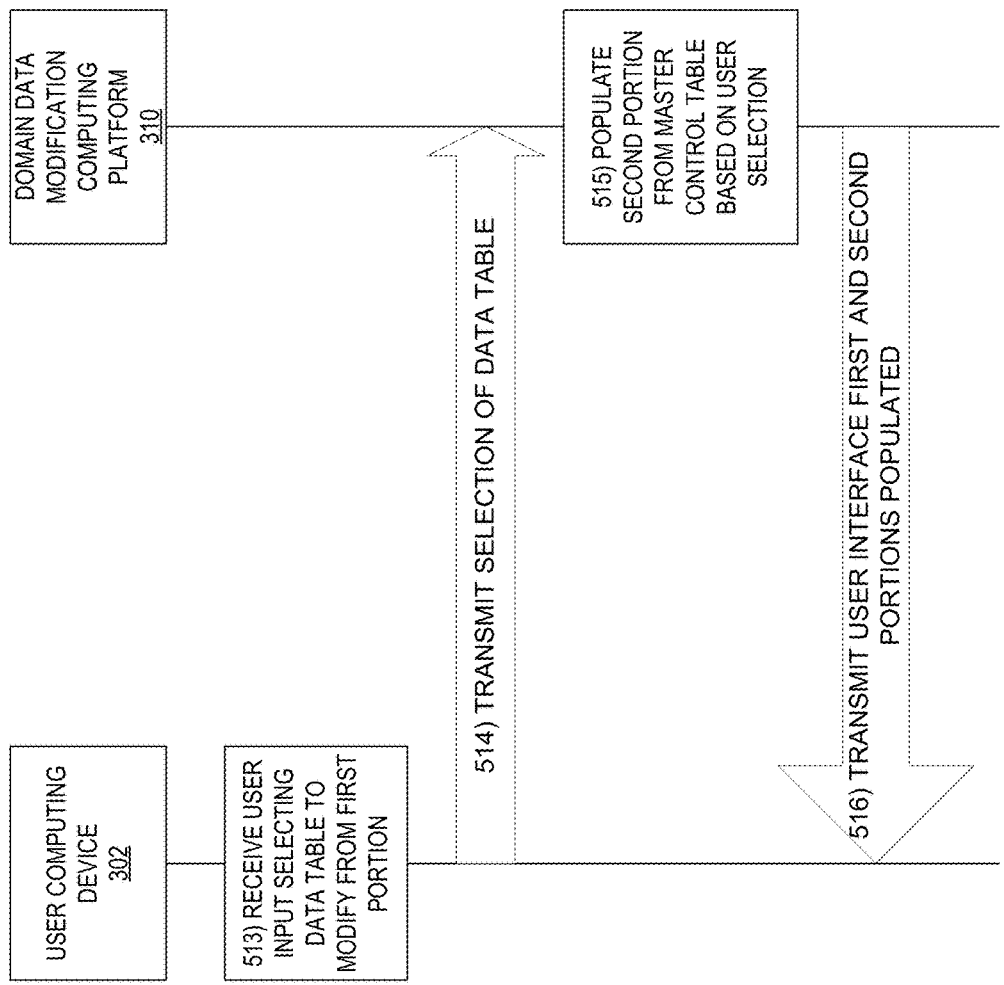

With reference to FIG. 5C, at step 513, user input selecting a data table for modification from the listing provided in the first portion of the modification user interface is received. The selection may be transmitted to the domain data modification computing platform 310 in step 514.

In response to the selection, the domain data modification computing platform 310 (e.g., a user interface generating module 317) may generate a modification user interface similar to the modification user interface previously generated but with the second portion populated as well in step 515. That is, selection of a domain data table from the first portion may cause the user interface to display the domain data table (e.g., data, configurations, and the like) in the second portion of the user interface. The data used to populate the second portion may be retrieved from the master control table (e.g., without accessing the selected domain data table itself). Populating the second portion may include displaying the data table in the configuration associated with that data table. For instance, the data, type of data, number of columns, and the like, may be displayed based on the data retrieved from the master control table.

Figure 5D:
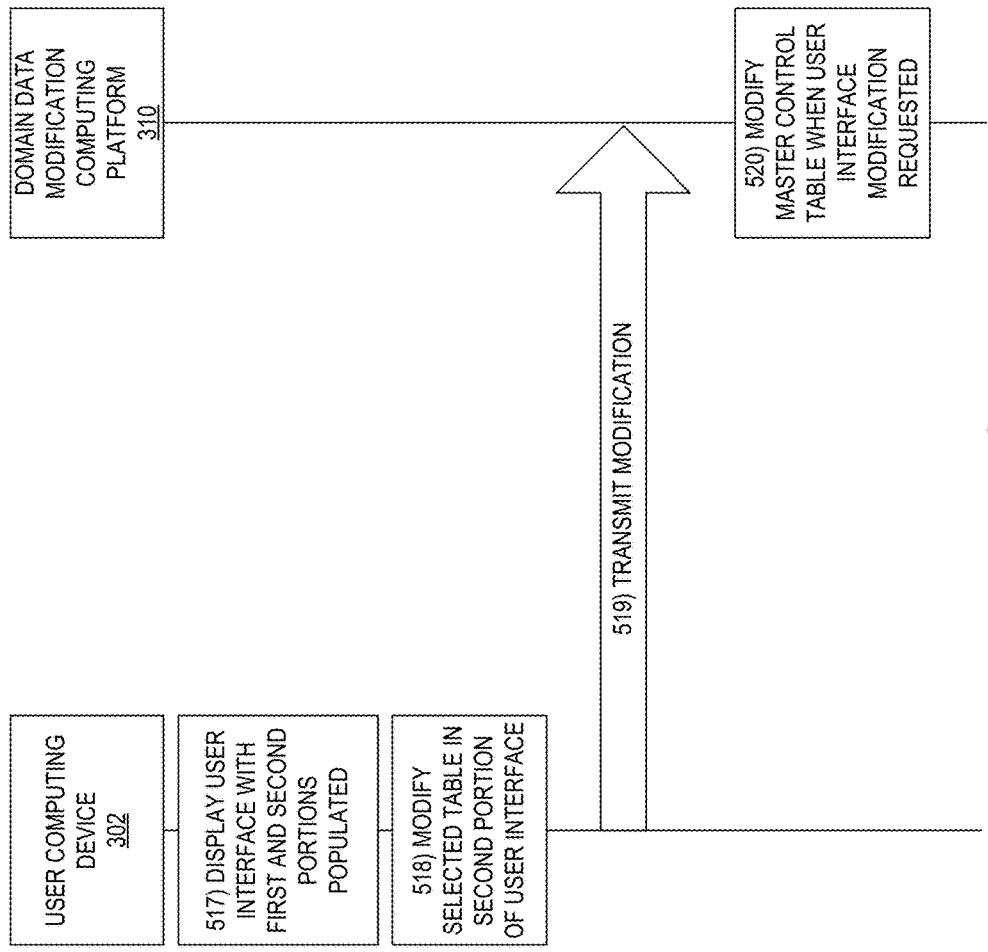

In step 516, the revised or regenerated modification user interface with the first portion and second portions populated may be transmitted to the user computing device 302. With reference to FIG. 5D, the modification user interface may be displayed on the user computing device 302 in step 517.

In step 518, user input may be received modifying the selected domain data via the second portion of the user interface. That is, a user may modify one or more attributes or features (e.g., data, configurations, and the like) displayed in the second portion. The modification may be transmitted to the domain data modification computing platform 310 in step 519 and, in some examples, the master control table may be updated with the modification in step 520. For instance, in arrangements in which the requested modification is a modification to a user interface, the master control table may be updated with the modification in step 520. Modifying the master control table may cause the domain data to be modified without requiring a coded modification to the selected domain data table. Accordingly, changes may be made dynamically, efficiently, and in a standardized manner.

With reference to FIG. 5E, the master control table may be refreshed in step 521. In some examples, the master control table may be refreshed automatically in response to modifications being made, completed, detected, or the like. Refreshing the master control table may implement the modifications made and may cause the system to generate one or more revised user interfaces in step 522. The revised user interfaces may be those associated with the application for which the modification was requested. In step 523, the modified user interface(s) (e.g., updated application) may be transmitted to the user computing device 302 in step 523 and may be displayed to the user in step 524.

Figure 6:
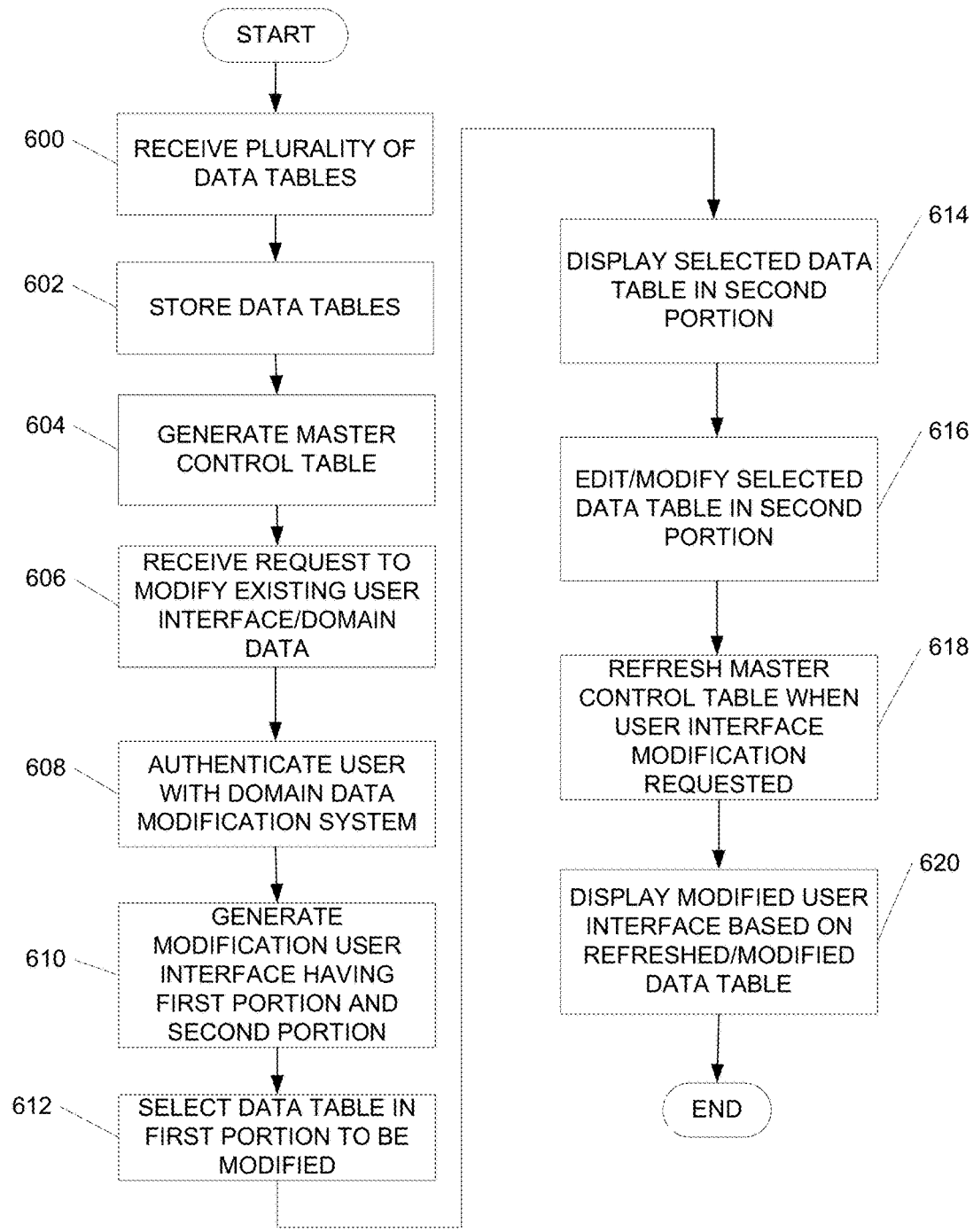
FIG. 6 depicts an illustrative method for generating a master control table and modifying domain data via the master control table according to one or more aspects described herein.

FIG. 6 illustrates one example method of dynamically modifying or transforming domain data in accordance with one or more aspects described herein. In step 600, a plurality of domain data tables may be received. The received domain data tables may be in one or more formats. In some example, the receive domain data tables may be reformatted to be read by a master control table. For instance, one or more domain data tables may be evaluated to determine a format associated with the domain data table. If the format does not match one or more formats configured to be read by the master control table, the domain data table may be reformatted to a format configured to be read by the master control table. The domain data tables may include differing numbers of columns, types of data, or the like.

In step 602, the domain data tables may be stored. For instance, the system may store the plurality of domain data tables for use in generating user interfaces that may be accessed by, interacted with, or the like, one or more users via, for instance, an on-line application or webpage, a mobile application, or the like.

In some examples, one or more domain data tables may be created from or via the master control table. In such examples, steps 600 and 602 may be omitted. Additionally or alternatively, some domain data tables may be generated and stored while others may be created via the master control table.

In step 604, a master control table may be generated. The master control table may include a common framework listing all of the plurality of domain data tables received and/or stored. The master control table may include code that is generic and may store configurations for each of the domain data tables associated with the master control table. For instance, the master control table may be able to read the configurations of each domain data table (such as number of columns, types of data, or the like) and may understand the structure, configuration, or the like, of each domain data table. Thus, the configuration of each domain data table may be stored in association with the master control table, which may enable changes to any of the domain data tables to be made via the master control table, as will be discussed more fully below.

In step 606, a request may be received to modify an existing user interface (e.g., an interface generated from one or more domain data tables associated with the master control table), a domain data table, or the like. The request may include a request to add an additional option to a drop-down menu, modify one or more settings associated with options on the user interface, add an additional source for verifying data input into the user interface, modify one or more time outs associated with the user interface, or the like.

In step 608, the user requesting to modify the user interface may access the domain data modification system and may be authenticated by the system, as discussed herein. Upon determining that the user is authorized to access the domain data modification system, a user interface having a first portion and a second portion may be generated and displayed to the user in step 610. Generating the user interface may include generating the first portion and the second portion and populating the first portion based on data retrieved from the master control table. In some examples, the first portion may include a listing of all domain tables associated with the master control table. Populating the first portion may include retrieving the master control table entries (e.g., reading the domain tables from the master control table) to determine data content, type of columns, types of columns, and other specifications and/or configurations of each domain table. In some examples, this information may be transferred from one or more data stores to the system to populate the first portion of the interface.

In step 612, a domain table may be selected from the first portion. Selection of the domain table from the first portion may populate the second portion (e.g., the system may generate another user interface, update the existing user interface, or the like) with a display of the selected domain data table (e.g., number of columns, types of columns, data, and the like) in step 614. Displaying the domain table may include calling up data that was previously transferred to the system in the populating of the first portion of the user interface.

In step 616, a transformation of data associated with the selected domain data table may be made. For instance, a user may modify or edit a portion of the data table (e.g., data within the table, number of columns, types of columns, or the like). The transformation of the data may be performed in the second portion of the user interface and, in some examples, may cause data to be transformed within the master control table.

In step 618, in at least some examples, the master control table may be refreshed. For instance, when a requested modification (e.g., a modification requested in, for example, step 606) is a request to modify a user interface, the master control table may be refreshed or updated in step 618. Refreshing the master control table may cause any transformations or modifications of data or configurations within a domain data table to be implemented. For instance, the modification made by the user may be implemented and the user interface for which the modification was requested may be updated dynamically. Accordingly, any updates or changes to a user interface may be quickly put out to the users of the system. In some examples, refreshing the master control table may be performed automatically upon changes being detected, completed, or the like. For instance, in step 620, the modified user interface may be displayed to the plurality of users accessing the system in response to the master control table being refreshed.

The systems and arrangements described herein provide a quick, efficient and dynamic way to modify user interfaces without requiring coding of each change (or each domain data table). Rather, changes may be implemented via the master control table and the changes may be quickly put into effect. This aids in standardizing and controlling changes made to domain data tables, user interfaces, and the like, and provides an efficient way to dynamically modify user interfaces.

Figure 7A:
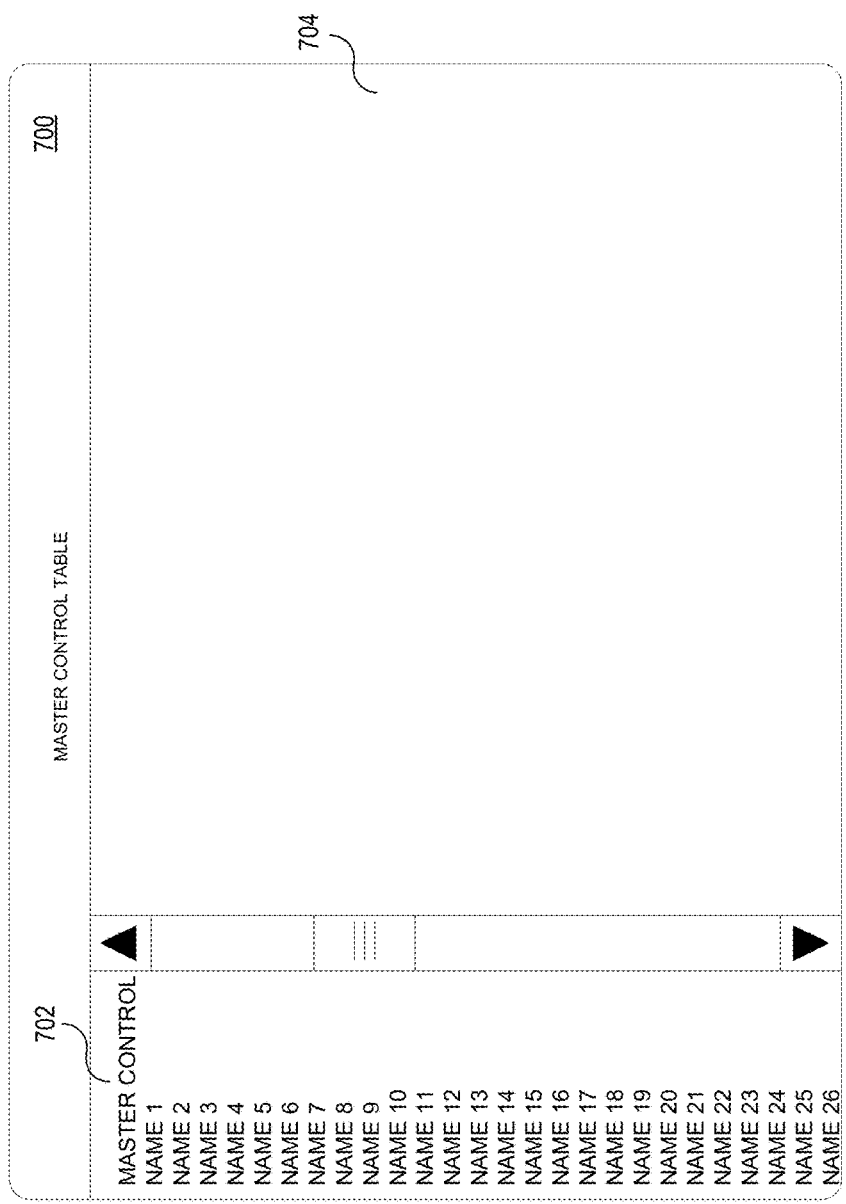
FIGS. 7A and 7B depict an illustrative user interface having a first portion and a second portion for modifying domain data according to one or more aspects described herein.
Figure 7B:
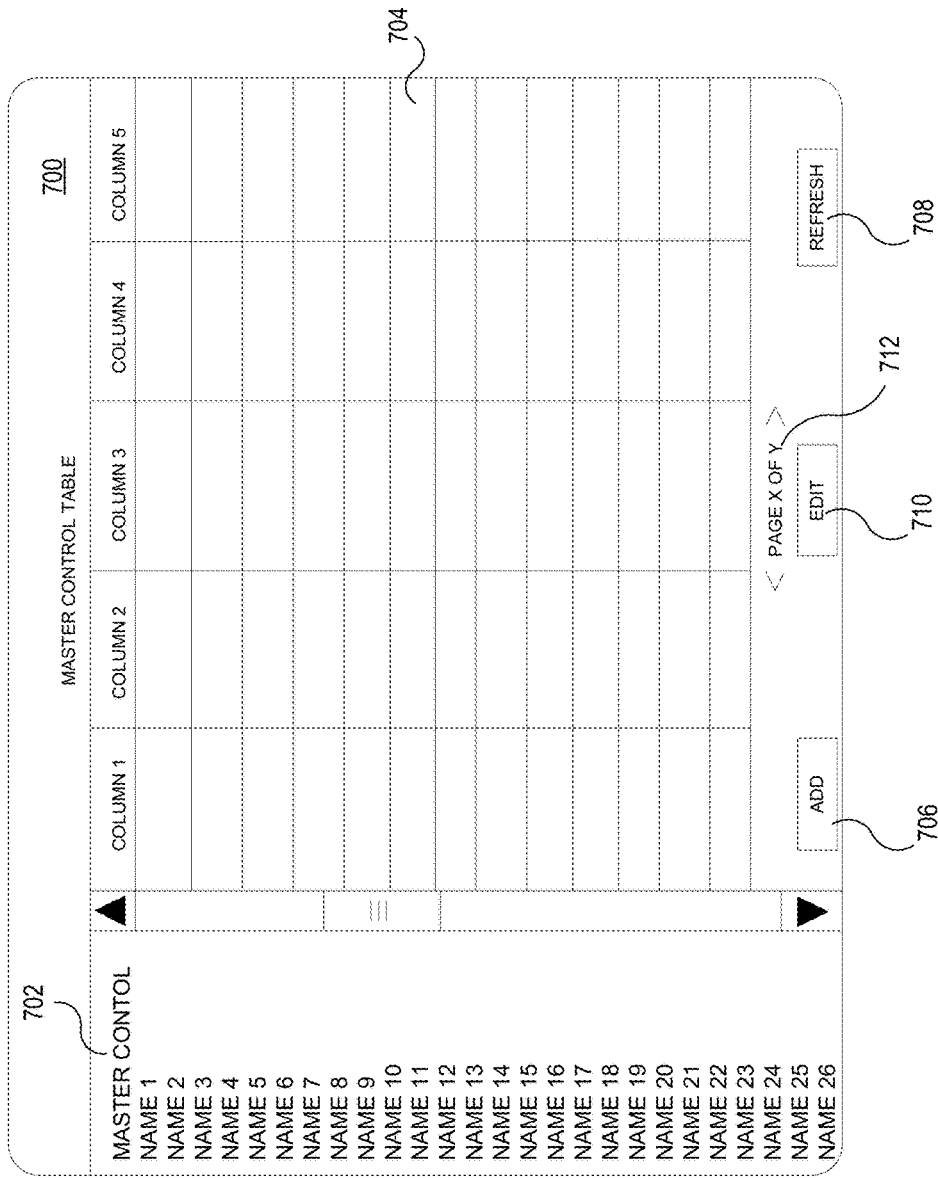

FIGS. 7A and 7B illustrate an example user interface that may be used to modify domain data via the master control table according to one or more aspects discussed herein. FIG. 7A illustrates one example user interface that may be generated. The user interface 700 includes a first portion 702 and a second portion 704. As shown in FIG. 7A, the first portion is populated with a listing of all data tables associated with the master control table. In some examples, the master control table itself may also be listed in the first portion such that modifications to the master control table, adding additional records to the master control table, and the like, may be made via the system and framework as well.

In some examples, populating the first portion 702 of the master control table may include reading all domain data tables from the master control table including the configurations and structure, definitions, and the like, of each domain data table. Accordingly, upon populating the first portion 702, all data associated with each data table may have been read by the master control table and may be available for display, editing, or the like, as desired.

Each domain data table (including, in at least some examples, the master control table) provided in the first portion 702 may be selectable. For instance, clicking or double clicking on a name of a domain data table may select the data table. Selection of a domain data table may cause the second portion 704 to be populated.

For instance, as shown in FIG. 7B, both the first portion 702 and the second portion 704 in the user interface 700 have been populated. Population of the second portion 704 may be based on the domain data table selected from the first portion. That is, selection of a domain data table may cause the second portion to populate with not only the data associated with that table but also any definitions, structure, configurations, or the like. For instance, since the master control table has read or retrieved the data and configuration for each table, the selected table may be displayed with all associated configurations in the second portion 704.

Edits and/or modifications to the selected domain data table may be performed in the second portion of the user interface 700. For instance, a user may select (e.g., click or double click on) a particular column, row, data entry, cell, or the like and a modification may be made. In some examples, selection of a desired item for modification may cause a second user interface to display (e.g., overlaying a portion of the first user interface) and edits may be made via the second user interface. Additionally or alternatively, a user may select "EDIT" option 710 to enable editing of domain data. For instance, in some examples, a user may select "EDIT" option 710 and the second user interface discussed above may appear (e.g., overlaying the modification user interface) and enabling a user to modify the domain data.

Interface 700 in FIG. 7B further includes an "ADD" option 706. Selection of option 706 may cause a second interface to display. The second interface may, in some examples, overlay the first interface and may include one or more fields for adding a record to the selected domain data table. For instance, the second user interface may include a field corresponding to each column of the selected domain data table for which a record is being added. Accordingly, the second user interface may be dynamically generated and a format of the user interface may vary based on the configurations of the domain data table selected (e.g., to which a record is being added).

Interface 700 further includes "REFRESH" option 708. Option 708 may be selected upon completion of one or more edits, modifications, or the like. Selection of option 708 may cause the master control table to update, thereby implementing any changes made to the selected domain data table. Accordingly, a user interface associated with the modified domain data table may be updated (e.g., regenerated) to reflect any changes made. Accordingly, changes to a user interface (or associated domain data) may be made dynamically without requiring coding changes to one or more domain data tables.

In some arrangements, the second portion 704 may include multiple pages of data. Accordingly, a user interface 700 may include region 712 indicating a page of data being displayed, a number of pages available, and/or options to move between pages (e.g., selectable arrows for moving between pages).

In some examples, the master control table may be searchable. That is, a user may search for a particular domain data table by inserting a name (or portion of a name) of the data table into a search bar. Further, a selected domain data table (e.g., displayed in the second portion 704) may also be searchable. Accordingly, any field, column, data, or the like, may be used as a search criteria to identify one or more records, definitions, or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments.

In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like). In such arrangements, any and/or all of the above-discussed communications between computing platforms may correspond to data being accessed, moved, modified, updated, and/or otherwise used by the single computing platform. Additionally or alternatively, the computing platform discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    generating, by a domain data modification computing platform, a master control table, the master control table including each domain data table of a plurality of domain data tables and including a configuration associated with each domain data table of the plurality of domain data tables;
    receiving, by the domain data modification computing platform, a request to modify at least one domain data table of the plurality of domain data tables;
    responsive to receiving the request to modify the at least one domain data table, generating, by the domain data modification computing platform, a first user interface having a first portion and a second portion simultaneously displayed in the first user interface;
    populating, by the domain data modification computing platform, the first portion of the generated first user interface with a listing of the plurality of domain data tables and the listing further including the master control table, populating the first portion including retrieving, from the master control table, the plurality of domain data tables and associated configuration of each domain data table in the plurality of domain data tables and displaying the listing of the plurality of domain data tables including the master control table in the first portion;
    receiving, by the domain data modification computing platform, user input selecting the at least one domain data table from the listing of the plurality of domain data tables and the master control table provided in the first portion;
    responsive to receiving the user input, populating, by the domain data modification computing platform, the second portion of the first user interface including displaying the selected at least one domain data table and the associated configuration simultaneously with the listing of domain data tables in the first portion;
    receiving, by the domain data modification computing platform, user input requesting modification of the selected at least one domain data table via the second portion of the first user interface;
    refreshing, by the domain data modification computing platform, the master control table to implement the requested modification of the selected at least one domain data table;
    updating the selected at least one domain data table to include the requested modification responsive to refreshing the master control table;
    generating, by the domain data modification computing platform a second user interface including the modification made to the at least one domain data table;
    receiving, by the domain data table modification computing platform, user input selecting the master control table from the listing of the plurality of domain data tables and the master control table provided in the first portion;
    responsive to receiving the user input selecting the master control table, re-populating, by the domain data modification computing platform, the second portion of the first user interface including displaying the selected master control table;
    receiving, by the domain data modification computing platform, user input requesting modification of the master control table via the second portion of the first user interface;
    refreshing, by the domain data modification computing platform, the master control table to implement the requested modification of the master control table; and
    refreshing, based on the refreshing the master control table, one or more domain data tables of the plurality of domain data tables.

2. The method of claim 1, further including:
    prior to generating the master control table, receiving, by the domain data modification computing platform, a plurality of domain data tables; and
    formatting, by the domain data modification computing platform, the plurality of domain data tables to be read by the master control table.

3. The method of claim 2, wherein formatting the plurality of domain data tables further includes:

evaluating, by the domain data modification computing platform, each domain data table of the plurality of domain data tables to identify one or more data tables having a format that is not compatible with the master control table; and reformatting the identified one or more data tables to have a format compatible with the master control table.

4. The method of claim 1, wherein the second user interface is a user interface associated with data from the selected at least one domain data table.

5. The method of claim 4, wherein the second user interface is a user interface associated with at least one of: an on-line application and a mobile application.

6. The method of claim 1, further including:
authenticating, by the domain data modification computing platform, a user requesting to modify the at least one domain data table.

7. The method of claim 1, wherein the request to modify the at least one domain data table includes a request to modify at least one of: a setting and a menu option.

8. The method of claim 1, wherein the associated configuration of each domain data table includes at least one of: a number of columns in the domain data table, a type of data in the domain data table, and definitions associated with the domain data table.

9. A domain data modification computing platform, comprising:
at least a first processor;
a first communication interface communicatively coupled to the at least a first processor; and
a first memory storing computer-readable instructions that, when executed by the at least a first processor, cause the domain data modification computing platform to:
generate a master control table, the master control table including each domain data table of a plurality of domain data tables and including a configuration associated with each domain data table of the plurality of domain data tables;
receive a request to modify at least one domain data table of the plurality of domain data tables;
responsive to receiving the request to modify the at least one domain data table, generate a first user interface having a first portion and a second portion simultaneously displayed in the first user interface;
populate the first portion of the generated first user interface with a listing of the plurality of domain data tables and the listing further including the master control table, populating the first portion including retrieving, from the master control table, the plurality of domain data tables and associated configuration of each domain data table in the plurality of domain data tables and displaying the listing of the plurality of domain data tables including the master control table in the first portion;
receive user input selecting the at least one domain data table from the listing of the plurality of domain data tables including the master control table provided in the first portion;
responsive to receiving the user input, populate the second portion of the first user interface including displaying the selected at least one domain data table and the associated configuration simultaneously with the listing of domain data tables in the first portion;
receive user input requesting modification of the selected at least one domain data table via the second portion of the first user interface;

refresh the master control table to implement the requested modification of the selected at least one domain data table;
update the selected at least one domain data table to include the requested modification responsive to refreshing the master control table;
generate a second user interface including the modification made to the at least one domain data table;
receive user input selecting the master control table from the listing of the plurality of domain data tables and the master control table provided in the first portion;
responsive to receiving the user input selecting the master control table, re-populate the second portion of the first user interface including displaying the selected master control table;
receive user input requesting modification of the master control table via the second portion of the first user interface;
refresh, by the domain data modification computing platform, the master control table to implement the requested modification of the master control table; and
refresh, based on the refreshing the master control table, one or more domain data tables of the plurality of domain data tables.

10. The domain data modification computing platform of claim 9, further including instructions that, when executed, cause the domain data modification computing platform to:
prior to generating the master control table, receive a plurality of domain data tables; and
format the plurality of domain data tables to be read by the master control table.

11. The domain data modification computing platform of claim 10, wherein formatting the plurality of domain data tables further includes:
evaluating each domain data table of the plurality of domain data tables to identify one or more data tables having a format that is not compatible with the master control table; and
reformatting the identified one or more data tables to have a format compatible with the master control table.

12. The domain data modification computing platform of claim 9, wherein the second user interface is a user interface associated with data from the selected at least one domain data table.

13. The domain data modification computing platform of claim 12, wherein the second user interface is a user interface associated with at least one of: an on-line application and a mobile application.

14. The domain data modification computing platform of claim 9, further including instructions that, when executed, cause the domain data modification computing platform to:
authenticate a user requesting to modify the at least one domain data table.

15. The domain data modification computing platform of claim 9, wherein the request to modify the at least one domain data table includes a request to modify at least one of: a setting and a menu option.

16. The domain data modification computing platform of claim 9, wherein the associated configuration of each domain data table includes at least one of: a number of columns in the domain data table, a type of data in the domain data table, and definitions associated with the domain data table.

17. One or more non-transitory computer-readable media storing instructions that, when executed by a computer system comprising at least one processor, memory, and a communication interface, cause the computer system to:

generate, by a domain data modification computing platform, a master control table, the master control table including each domain data table of a plurality of domain data tables and including a configuration associated with each domain data table of the plurality of domain data tables;

receive, by the domain data modification computing platform, a request to modify at least one domain data table of the plurality of domain data tables;

responsive to receiving the request to modify the at least one domain data table, generate, by the domain data modification computing platform, a first user interface having a first portion and a second portion simultaneously displayed in the first user interface;

populate, by the domain data modification computing platform, the first portion of the generated first user interface with a listing of the plurality of domain data tables and the listing further including the master control table, populating the first portion including retrieving, from the master control table, the plurality of domain data tables and associated configuration of each domain data table in the plurality of domain data tables and displaying the listing of the plurality of domain data tables including the master control table in the first portion;

receive, by the domain data modification computing platform, user input selecting the at least one domain data table from the listing of the plurality of domain data tables including the master control table provided in the first portion;

responsive to receiving the user input, populate, by the domain data modification computing platform, the second portion of the first user interface including displaying the selected at least one domain data table and the associated configuration simultaneously with the listing of domain data tables in the first portion;

receive, by the domain data modification computing platform, user input requesting modification of the selected at least one domain data table via the second portion of the first user interface;

refresh, by the domain data modification computing platform, the master control table to implement the requested modification of the selected at least one domain data table;

update the selected at least one domain data table to include the requested modification responsive to refreshing the master control table;

generate, by the domain data modification computing platform a second user interface including the modification made to the at least one domain data table;

receive user input selecting the master control table from the listing of the plurality of domain data tables and the master control table provided in the first portion;

responsive to receiving the user input selecting the master control table, re-populate the second portion of the first user interface including displaying the selected master control table;

receive user input requesting modification of the master control table via the second portion of the first user interface;

refresh, by the domain data modification computing platform, the master control table to implement the requested modification of the master control table; and refresh, based on the refreshing the master control table, one or more domain data tables of the plurality of domain data tables.

18. The one or more non-transitory computer-readable media of claim 17, further including instructions that, when executed, cause the computer system to:

prior to generating the master control table, receive, by the domain data modification computing platform, a plurality of domain data tables; and format, by the domain data modification computing platform, the plurality of domain data tables to be read by the master control table.

19. The one or more non-transitory computer-readable media of claim 18, wherein formatting the plurality of domain data tables further includes:

evaluating, by the domain data modification computing platform, each domain data table of the plurality of domain data tables to identify one or more data tables having a format that is not compatible with the master control table; and reformatting the identified one or more data tables to have a format compatible with the master control table.

20. The one or more non-transitory computer-readable media of claim 17, wherein the associated configuration of each domain data table includes at least one of: a number of columns in the domain data table, a type of data in the domain data table, and definitions associated with the domain data table.

* * * * *